United States Patent
Nishioka

(10) Patent No.: US 10,120,368 B2
(45) Date of Patent: Nov. 6, 2018

(54) MANUFACTURING ADJUSTMENT SYSTEM THAT ADJUSTS MANUFACTURING STATUSES OF MULTIPLE MACHINES

(71) Applicant: FANUC CORPORATION, Yamanashi (JP)

(72) Inventor: Akira Nishioka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 2 days.

(21) Appl. No.: 15/496,182

(22) Filed: Apr. 25, 2017

(65) Prior Publication Data

US 2017/0315540 A1  Nov. 2, 2017

(30) Foreign Application Priority Data

Apr. 28, 2016 (JP) ................... 2016-091898

(51) Int. Cl.
G05B 19/4093 (2006.01)
G05B 19/406 (2006.01)
G05B 19/418 (2006.01)

(52) U.S. Cl.
CPC ..... *G05B 19/40937* (2013.01); *G05B 19/406* (2013.01); *G05B 19/41865* (2013.01); *G05B 19/41875* (2013.01); *G05B 2219/32015* (2013.01); *G05B 2219/36178* (2013.01); *G05B 2219/50059* (2013.01); *G05B 2219/50322* (2013.01); *Y02P 90/02* (2015.11); *Y02P 90/08* (2015.11); *Y02P 90/30* (2015.11)

(58) Field of Classification Search
None
See application file for complete search history.

(56) References Cited

U.S. PATENT DOCUMENTS

| 5,465,221 A | * | 11/1995 | Merat | ............. G05B 19/41875 |
|---|---|---|---|---|
| | | | | 702/83 |
| 2009/0247049 A1 | * | 10/2009 | Inoue | ..................... B23Q 17/20 |
| | | | | 451/5 |

FOREIGN PATENT DOCUMENTS

| JP | 4841370 A | 6/1973 |
|---|---|---|
| JP | S50047093 A | 4/1975 |
| JP | 59134656 A | 8/1984 |
| JP | 1994-223081 A | 8/1994 |
| JP | 2000343425 A | 12/2000 |
| JP | 2003311450 A | 11/2003 |
| JP | 2004190677 A | 7/2004 |
| JP | 2005309713 A | 11/2005 |
| JP | 2006017069 A | 1/2006 |
| JP | 2008015938 A | 1/2008 |
| JP | 4674237 B | 4/2011 |

* cited by examiner

*Primary Examiner* — Ryan A Jarrett
(74) *Attorney, Agent, or Firm* — RatnerPrestia

(57) ABSTRACT

A manufacturing adjustment system includes a decision part and a tolerance setting part. The decision part decides whether part dimensions calculated by a part dimension calculation part fall within a predetermined range of dimensions and a total machining time calculated by a total machining-time calculation part falls within a predetermined time. The tolerance setting part sets a workpiece tolerance for each machine based on the decision result of the decision part when the workpieces are produced by the machines.

4 Claims, 3 Drawing Sheets

MANUFACTURING ADJUSTMENT SYSTEM THAT ADJUSTS MANUFACTURING STATUSES OF MULTIPLE MACHINES

BACKGROUND OF THE INVENTION

1. Field of the Invention

The present invention relates to a manufacturing adjustment system that adjusts the manufacturing statuses of multiple machines installed in a manufacturing factory. The present invention particularly relates to a manufacturing adjustment system that adjusts the manufacturing statuses of multiple machines in a manufacturing facility where parts are manufactured by combining articles (Hereinafter will be referred to as workpieces) machined by the machines.

2. Description of the Related Art

In a manufacturing factory, a manufacturing facility such as a manufacturing line and a manufacturing cell is constructed to perform a process of manufacturing parts. In each manufacturing facility, machining and assembly are performed using multiple machines including a machine tool and a robot. The machines constituting the manufacturing facility operate in response to a manufacturing instruction from an administrative computer that manages a controller connected to each of the machines. The administrative computer manages a manufacturing process, part quality, safety, and so on while acquiring information including the operating statuses and manufacturing records of the machines.

In a manufacturing facility such as a manufacturing line and a manufacturing cell, at least two workpieces (e.g., parts) produced by at least two respective machines may be ultimately combined using another machine in the manufacturing facility so as to complete a part (e.g., a device). In this case, the workpieces constituting the part always vary in dimension and shape. Since the part is an assembly of the workpieces varying in dimension and shape, finished parts also inevitably vary in dimension.

Conventionally, in order to reduce variations in the dimensions of parts, each including multiple workpieces, close tolerances are set for the workpieces constituting the parts on the assumption that all the parts have a minimum tolerance value. However, the close tolerances for the workpieces may increase the machining time of the workpieces. This may require an extended period for completing the parts, leading to higher manufacturing cost. In order to avoid this problem, in a proposal, close tolerances are set only for workpieces that affect the quality of parts while tolerances for other workpieces are increased.

For example, Japanese Unexamined Patent Publication (Kokai) No. 6-223081 (Hereinafter will be referred to as Patent Literature 1) discloses a method of properly allocating the tolerances of workpieces that constitute an assembly, in consideration of the materials, manufacturing method, and related cost of the workpieces. Patent Literature 1 in particular discloses a method of defining a first tolerance where the cost cannot be considerably reduced, a second tolerance where the cost substantially starts increasing, and a third tolerance where an assembly cannot be practically completed. The tolerances are properly allocated as workpiece tolerances.

Japanese Patent No. 4674237 (Hereinafter will be referred to as Patent Literature 2) discloses calculation of a deviation relative to a design specification value at a point of measurement on a structure including multiple components, and calculation of the dimensional tolerance ratio of a particular component (contribution ratio) to the total dimensional tolerances (dimensional variations) of the components constituting the point of measurement. Patent Literature 2 further discloses that if the calculated deviation does not satisfy the desired quality of the structure, the dimensional tolerances of the components are reset according to the calculated contribution ratio.

Patent Literature 1 and Patent Literature 2 do not, however, describe the real-time function of collecting the dimensions of workpieces produced by operated machines. Thus, in the inventions described in Patent Literature 1 and Patent Literature 2, the previously calculated tolerances of the workpieces need to be inputted as machining parameters to the controller of each machine before the manufacturing of the part including the workpieces.

Moreover, in the inventions described in Patent Literature 1 and Patent Literature 2, during the manufacturing of the part including the workpieces, the tolerances of the workpieces cannot be set in real time in machines so as to adjust the dimensions and manufacturing time of the part within respective predetermined ranges. Furthermore, a workpiece tolerance for each machine cannot be adjusted in real time in consideration of an actual machine status or an actual workpiece machining status, for example, machining accuracy reduced by wear of a tool.

SUMMARY OF THE INVENTION

The present invention provides a manufacturing adjustment system that can adjust, within respective predetermined ranges, the dimensions and manufacturing time of a part including multiple workpieces produced by multiple machines.

A first aspect of the present disclosure provides a manufacturing adjustment system that adjusts a manufacturing status of a manufacturing facility where a part including multiple workpieces is manufactured, the manufacturing adjustment system including:

multiple machines that manufacture the workpieces, the machines each having a measuring instrument that measures dimensions and a machining time of the workpiece; and a machine controller that controls the machines, the machine controller being connected so as to communicate with the machines, the machine controller including:

a measurement information acquisition part that acquires, in real time, measurement information including the dimensions and machining times of the workpieces measured by the measuring instruments of the machines;

a part dimension calculation part that calculates dimensions of the part based on the dimensions of the workpieces produced by the machines, the dimensions being acquired by the measurement information acquisition part;

a total machining-time calculation part that calculates a total machining time of the machining times of the workpieces based on the machining times of the workpieces produced by the machines, the machining times being acquired by the measurement information acquisition part;

a decision part that decides whether the part dimensions calculated by the part dimension calculation part fall within a predetermined range of dimensions and the total machining time calculated by the total machining-time calculation part falls within a predetermined time;

a tolerance setting part that sets a workpiece tolerance for each of the machines based on a decision result of the decision part when the workpieces are produced by the machines; and an operation command part that transmits, to each of the machines, an operation command including the workpiece tolerance set for each of the machines.

According to the manufacturing adjustment system of the first aspect, a second aspect provides a manufacturing adjustment system in which the manufacturing facility is a manufacturing line where the workpieces are sequentially produced by the machines according to a predetermined order of the machines and then the produced workpieces are sequentially combined so as to complete the part in the final machine, each time the workpiece is produced by the machine in the predetermined order of the machines, the measuring instrument in each of the machines measures the dimensions of the workpiece and the measurement information acquisition part acquires the measured dimensions of the workpiece in real time, the decision part has an additional function of deciding, each time the measurement information acquisition part acquires the dimensions of the workpiece produced by each of the machines, whether the dimensions of the workpiece fall within a range of dimensions, the range being determined for each of the workpieces, and the tolerance setting part has an additional function of adjusting a workpiece tolerance previously set for a second machine in charge of a process immediately after a first machine, based on a decision result of the decision part regarding the workpiece produced by the first machine that is any one of the machines.

According to the manufacturing adjustment system of the first aspect or the second aspect, a third aspect provides a manufacturing adjustment system further including a manufacturing administrative computer that manages a manufacturing status of the part, the manufacturing administrative computer being connected so as to communicate with the machine controller, wherein the measurement information acquisition part transmits the measurement information acquired for each of the machines to the manufacturing administrative computer, the part dimension calculation part transmits the dimensions of the part to the manufacturing administrative computer, the total machining-time calculation part transmits the total machining time to the manufacturing administrative computer, and the tolerance setting part transmits the workpiece tolerance set for each of the machines to the manufacturing administrative computer, the manufacturing administrative computer including:

a database unit that stores the workpiece tolerance set for each of the machines and stores the dimensions and machining times of the workpieces in association with the part dimensions and the total machining time that are calculated based on the dimensions and machining times of the workpieces, the dimensions and machining times being acquired from the measuring instruments each time the workpiece is produced by the machine according to the workpiece tolerance, and a database unit where a workpiece tolerance set for each of the machines, the workpiece dimensions and machining times, and the part dimensions and total machining time are stored in association with one another, the workpiece dimensions and machining times being acquired from the measuring instruments each time the workpiece is produced by the machines according to the workpiece tolerance, the part dimensions and total machining time being calculated based on the workpiece dimensions and machining times, a dimension variation diagnosis unit that diagnoses variations in workpiece dimensions in each of the machines, the dimensions being sequentially stored in the database unit each time the workpiece is produced by each of the machines according to a workpiece tolerance set for each of the machines.

According to the manufacturing adjustment system of the third aspect, a fourth aspect provides a manufacturing adjustment system in which the manufacturing administrative computer further includes a learning unit that learns the optimum tolerances of the workpieces based on the workpiece tolerances stored for the machines in the database unit and the dimensions and total machining time of the part including the workpieces produced according to the workpiece tolerances.

BRIEF DESCRIPTION OF THE DRAWINGS

A detailed description about a typical embodiment of the present invention shown in the accompanying drawings further clarifies the object, characteristics, advantages of the present invention and other objects, characteristics, and advantages of the present invention.

DETAILED DESCRIPTION

Figure 1:
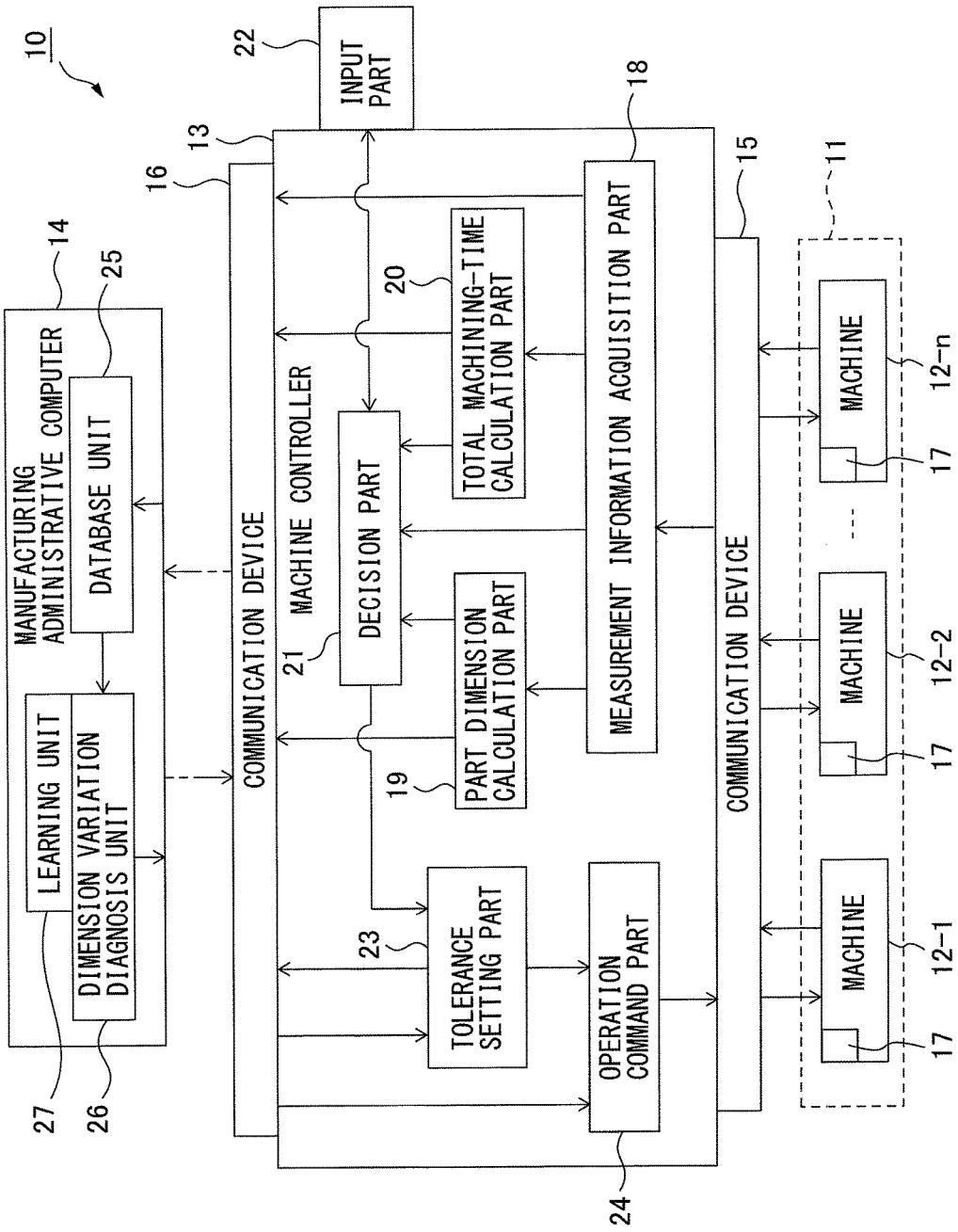
FIG. 1 is a block diagram schematically showing a manufacturing adjustment system according to an embodiment.

An embodiment of the present disclosure will be described below with reference to the accompanying drawings. In the reference drawings, the same members are indicated by the same reference characters. To enhance understanding, the scales of these drawings are optionally changed. The illustrated embodiment is merely an example and thus does not limit the present invention. FIG. 1 is a block diagram schematically showing a manufacturing adjustment system according to the embodiment.

A manufacturing adjustment system 10 according to the present embodiment shown in FIG. 1 is a system for adjusting the manufacturing statuses of n machines 12-1 to 12-n (n is a natural number of at least 2) constituting a manufacturing facility 11 where multiple workpieces are combined to manufacture a part.

Specifically, as shown in FIG. 1, the manufacturing adjustment system 10 includes the manufacturing facility 11, a machine controller 13 that controls the machines 12-1 to 12-n of the manufacturing facility 11, and a manufacturing administrative computer 14 that manages the manufacturing status of the part.

The manufacturing facility 11 is disposed in a manufacturing factory for manufacturing the part. The manufacturing facility 11 may be disposed over the manufacturing factories of multiple buildings, whereas the machine controller 13 and the manufacturing administrative computer 14 may be disposed in a different building from the manufacturing factory. For example, the machine controller 13 may be disposed in a different building from the manufacturing factory. In this case, the machine controller 13 and the machines 12-1 to 12-n in the manufacturing facility 11 are preferably connected so as to communicate with each other via a first communication device 15, e.g., an intranet network.

The manufacturing administrative computer 14 may be disposed in an office remote from the manufacturing factory. In this case, the manufacturing administrative computer 14 and the machine controller 13 are preferably connected so as to communicate with each other via a second communication device 16, e.g., an Internet network. The manufacturing administrative computer 14 preferably includes a cloud computer.

The manufacturing facility 11 may be a manufacturing facility of a cell production system or a line production system, that is, a manufacturing cell or a manufacturing line where the machines 12-1 to 12-*n* are flexibly combined.

In the present embodiment, the manufacturing facility 11 is a manufacturing cell. Specifically, different workpieces machined by the machines 12-1 to 12-*n* are combined by another machine so as to complete a part. The workpieces are components constituting a device, e.g., a motor. The part is a device including the components, that is, an assembly. It is understood that the present invention may be applied to a manufacturing line. As an example of a manufacturing line, workpieces produced by the machines 12-1 to 12-*n* may be sequentially combined by an assembling mechanical unit (not shown) for the machines 12-1 to 12-*n* so as to complete a part in the final machine 12-*n*.

Some of the machines 12-1 to 12-*n* are used for producing workpieces and include, for example, an NC machine tool, an industrial robot, a press machine, a die casting machine, and an injection molding machine. Moreover, one of the machines 12-1 to 12-*n* is used for ultimately combining workpieces or is used as an assembling mechanical unit for the machines 12-1 to 12-*n*. Such a machine is, for example, an industrial robot or a component mounter. In the present embodiment, particularly each of the machines 12-1 to 12-*n* preferably includes a measuring instrument 17 that measures the dimensions and machining time of a produced workpiece. Each time a workpiece is produced, the measuring instrument 17 in each of the machines 12-1 to 12-*n* preferably outputs measurement result information on the dimensions and machining of the workpiece.

The machine controller 13 and the manufacturing administrative computer 14 each include a computer, e.g., a personal computer provided with a CPU (control processing unit), a ROM (read only memory), a RAM (random access memory), and a communication control part (not shown). Each of the machines 12-1 to 12-*n* includes a memory, e.g., a ROM or a RAM, a CPU, and a communication control part (not shown). The communication control part controls the exchange of information with the communication control part of the machine controller 13.

The manufacturing adjustment system 10 of the present embodiment will be specifically described below. The machine controller 13 and the manufacturing administrative computer 14 will be particularly described in detail.

As shown in FIG. 1, the machine controller 13 includes a measurement information acquisition part 18, a part dimension calculation part 19, a total machining-time calculation part 20, a decision part 21, an input part 22, a tolerance setting part 23, and an operation command part 24. These functional parts (18 to 24) may be controlled by the CPU (not shown) in the machine controller 13 or may function in response to the command of a program stored in the machine controller 13.

The measurement information acquisition part 18 acquires measurement information including the dimensions and machining times of workpieces in real time, the dimensions and machining times being measured by the measuring instruments 17 of the machines 12-1 to 12-*n*. Furthermore, the measurement information acquisition part 18 outputs the measurement information to the part dimension calculation part 19, the total machining-time calculation part 20, and the decision part 21 and also transmits the information to a database unit 25 of the manufacturing administrative computer 14 through a second communication device 16.

The part dimension calculation part 19 calculates the dimensions of parts based on the dimensions of workpieces produced by the machines 12-1 to 12-*n*, the dimensions being acquired by the measurement information acquisition part 18. For example, part assembly information is stored beforehand in the part dimension calculation part 19, the part assembly information including the assembling steps and assembling positions of workpieces when a part is produced by combining the workpieces.

The part dimension calculation part 19 can calculate the dimensions of the part by integrating the dimensions of the workpieces based on the part assembly information. Specifically, in the present embodiment, a part is an assembly of workpieces produced by the machines 12-1 to 12-*n* of the manufacturing facility 11 and thus the dimensions of the part can be calculated by identifying the dimensions of the workpieces and the part assembly information. The part dimension calculation part 19 included in the machine controller 13 of the present embodiment may not be provided in the present invention. Specifically, in the case where the machine for combining multiple workpieces produced by the machines 12-1 to 12-*n* measures the dimensions of a finished part and then the part dimensions are acquired by the measurement information acquisition part 18, the calculation of the part dimensions may be omitted in the part dimension calculation part 19.

The part dimension calculation part 19 outputs the calculated part dimensions to the decision part 21 and also transmits the information to the database unit 25 of the manufacturing administrative computer 14 through the second communication device 16.

The total machining-time calculation part 20 calculates a total machining time, which is the sum of the machining times of workpieces, based on the machining times of workpieces produced by the machines 12-1 to 12-*n*, the machining times being acquired by the measurement information acquisition part 18. The total machining-time calculation part 20 outputs the calculated total machining time to the decision part 21 and also transmits the total machining time to the database unit 25 of the manufacturing administrative computer 14 through the second communication device 16.

The decision part 21 decides whether the part dimensions calculated by the part dimension calculation part 19 fall within a predetermined range of dimensions and the total machining time calculated by the total machining-time calculation part 20 falls within a predetermined time. The input part 22 allows the input and setting of the predetermined range of dimensions and the predetermined time to the decision part 21. The input part 22 is, for example, a keyboard for a personal computer connected to the machine controller 13 or a touch panel on a display device. It is understood that the predetermined range of dimensions and the predetermined time may be set by the manufacturing administrative computer 14.

The tolerance setting part 23 sets a workpiece tolerance for each of the machines 12-1 to 12-*n* based on the decision result of the decision part 21 when workpieces are produced by the machines 12-1 to 12-*n*. In other words, a workpiece tolerance set for each of the machines 12-1 to 12-*n* is changed based on the decision result of the decision part 21. Moreover, the tolerance setting part 23 transmits the set workpiece tolerance to the database unit 25 of the manufacturing administrative computer 14 through the second communication device 16. The tolerance is, for example, a dimensional tolerance or a geometric tolerance.

The operation command part 24 is configured to transmit an operation command to each of the machines 12-1 to 12-*n*, the operation command including a workpiece tolerance set for each of the machines 12-1 to 12-*n*.

As described above, when a workpiece tolerance is set for each of the machines 12-1 to 12-*n* in the tolerance setting part 23, the tolerance is preferably determined as follows: for example, if part dimensions calculated by the part dimension calculation part 19 do not fall within the predetermined range of dimensions as a decision result of the decision part 21, the tolerance setting part 23 reduces, with the same reduction ratio, workpiece tolerances previously set for the respective machines 12-1 to 12-*n*. In other words, closer tolerances are set. If part dimensions calculated by the part dimension calculation part 19 fall within the predetermined range of dimensions but the total machining time calculated by the total machining-time calculation part 20 does not fall within the predetermined time, workpiece tolerances previously set for some of the machines 12-1 to 12-*n* are increased with a predetermined enlargement ratio. In other words, rough tolerances are set. The predetermined enlargement ratio may be equal to, for example, the reduction ratio. Rough tolerances for workpieces shorten the machining time of the workpieces. In this case, it is preferable that the machines with rough workpiece tolerances out of the machines 12-1 to 12-*n* are likely to contribute to a reduction in total machining time. For example, the machine for producing a workpiece with a maximum machining time is selected from the machines 12-1 to 12-*n*.

As shown in FIG. 1, the manufacturing administrative computer 14 includes the database unit 25, a dimension variation diagnosis unit 26, and a learning unit 27.

As described above, the dimensions and machining times of workpieces measured by the machines 12-1 to 12-*n* are transmitted to the database unit 25. Furthermore, part dimensions calculated by the part dimension calculation part 19, a total machining time calculated by the total machining-time calculation part 20, and a workpiece tolerance set for each of the machines 12-1 to 12-*n* by the tolerance setting part 23 are transmitted to the database unit 25.

The database unit 25 sequentially stores the dimensions and machining times of workpieces, the dimensions and machining times being acquired from the measuring instruments 17 of the machines 12-1 to 12-*n* each time a workpiece is produced by the machines 12-1 to 12-*n* according to a workpiece tolerance set for each of the machines 12-1 to 12-*n*. Moreover, the database unit 25 stores the dimensions and machining times of the workpieces in association with part dimensions and total machining times that are calculated based on the dimensions and machining times of the workpieces.

The dimension variation diagnosis unit 26 diagnoses variations in workpiece dimensions in each of the machines 12-1 to 12-*n*, the dimensions being sequentially stored in the database unit 25 each time a workpiece is produced by the machines 12-1 to 12-*n* according to a workpiece tolerance set for each of the machines 12-1 to 12-*n*. In other words, the dimension variation diagnosis unit 26 monitors variations in workpiece dimensions from the history of the dimensions of the workpieces produced by the machines 12-1 to 12-*n*, for example, according to a determined standard deviation.

The dimension variation diagnosis unit 26 identifies the machines where workpieces considerably vary in dimension, out of the machines 12-1 to 12-*n*. Moreover, the dimension variation diagnosis unit 26 transmits a command for reducing the set workpiece tolerances of the machines with the predetermined reduction ratio, to the tolerance setting part 23.

The learning unit 27 learns the optimum tolerances of the workpieces based on workpiece tolerances stored for the machines 12-1 to 12-*n* in the database unit 25 and part dimensions and total machining times when the workpieces produced according to the tolerances are combined. The learning may be known machine learning such as supervised learning, unsupervised learning, and reinforcement learning.

For example, the learning unit 27 evaluates part dimensions and total machining times based on predetermined reference dimensions and a predetermined time when workpieces produced according to the workpiece tolerances of the machines 12-1 to 12-*n* are combined. At this point, the smaller the difference between the part dimension and the predetermined reference dimension, the higher the evaluation scores for the part dimension. The shorter the total machining time of a part relative to the predetermined time, the higher the evaluation score for the total machining time. In this way, the learning unit 27 learns workpiece tolerances to be set for the respective machines 12-1 to 12-*n*, in association with the part dimensions and total machining times when the workpieces are combined, and the evaluation scores of the part dimensions and total machining times. Furthermore, the learning unit 27 preferably determines, as optimum values, the workpiece tolerances of the machines 12-1 to 12-*n* where both of the evaluation scores are maximized, and then the learning unit 27 transmits the workpiece tolerances to the tolerance setting part 23. Thus, workpieces constituting a part are produced by the machines 12-1 to 12-*n* with part dimensions within the predetermined range of dimensions and a minimum total machining time for manufacturing the part.

Figure 2:
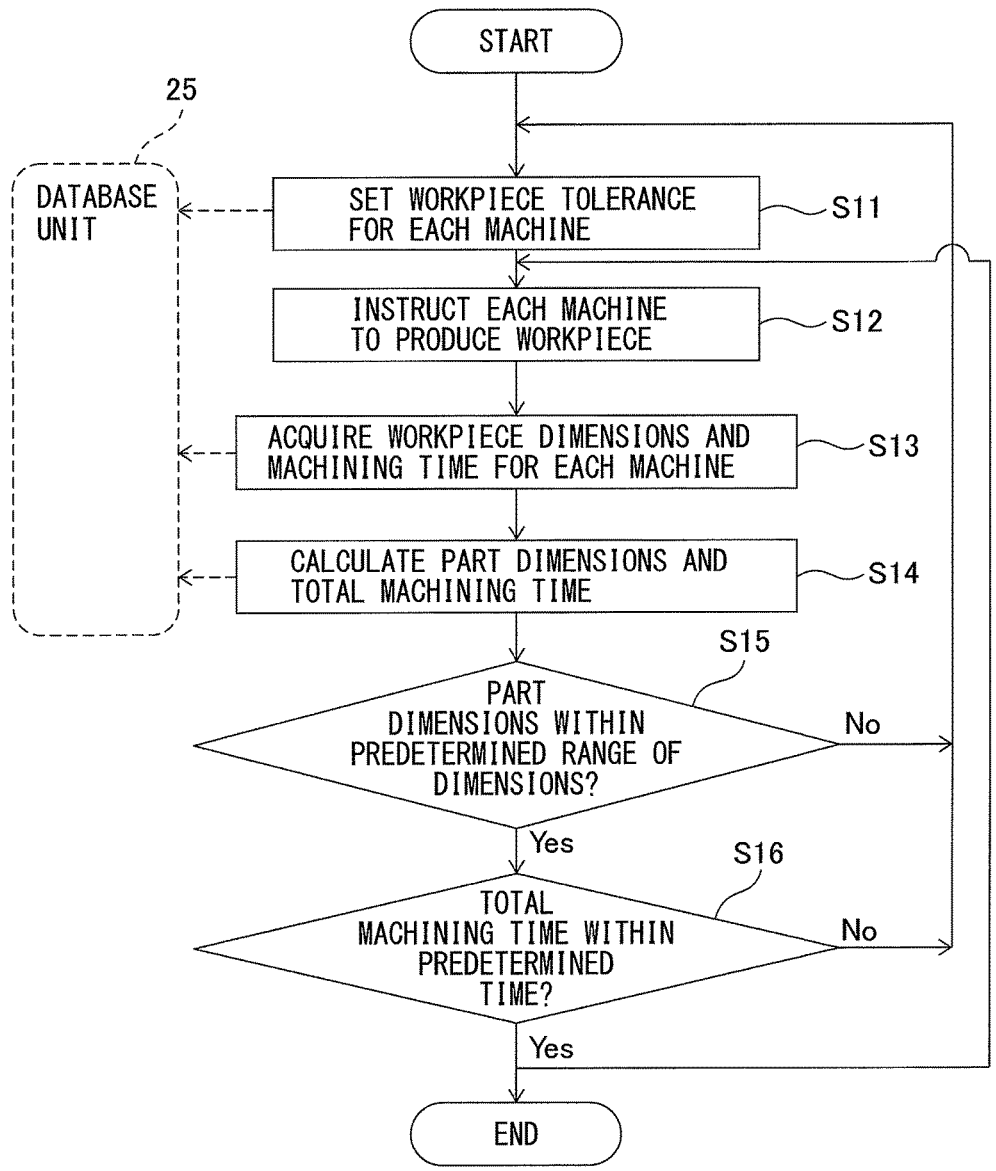
FIG. 2 is a flowchart showing an operation example of the manufacturing adjustment system shown in FIG. 1.

FIG. 2 is a flowchart showing an operation example of the manufacturing adjustment system 10 shown in FIG. 1. Referring to FIG. 2, the operation example of the manufacturing adjustment system 10 in FIG. 1 will be discussed below.

First, in step S11 of FIG. 2, the tolerance setting part 23 of the machine controller 13 sets a workpiece tolerance for each of the machines 12-1 to 12-*n* in response to an instruction from the manufacturing administrative computer 14. However, in the first production of a part including multiple workpieces, a workpiece tolerance for each of the machines 12-1 to 12-*n* is set at a minimum possible tolerance for the machines 12-1 to 12-*n*.

Subsequently, in step S12 of FIG. 2, the operation command part 24 instructs each of the machines 12-1 to 12-*n* to produce a workpiece. Thus, a workpiece is produced by each of the machines 12-1 to 12-*n* according to the tolerance set by the tolerance setting part 23. During the production, a workpiece machining time is measured for each of the machines 12-1 to 12-*n* by the measuring instrument 17. At the completion of the production of workpieces in the machines 12-1 to 12-*n*, workpiece dimensions are measured for each of the machines 12-1 to 12-*n* by the measuring instrument 17.

Subsequently, in step S13 of FIG. 2, the measurement information acquisition part 18 acquires, in real time, the workpiece dimensions and the machining times that have been measured for the machines 12-1 to 12-*n* by the measuring instruments 17 as described above.

After that, in step S14 of FIG. 2, the part dimension calculation part 19 and the total machining-time calculation part 20 calculate the dimensions and the total machining time of a part that is an assembly of workpieces. More specifically, the part dimension calculation part 19 calculates part dimensions based on the dimensions of the workpieces produced by the machines 12-1 to 12-*n*, the dimensions being acquired by the measurement information acquisition part 18. The calculated part dimensions are stored in the database unit 25 of the manufacturing administrative computer 14. The total machining-time calculation part 20 calculates the total machining time that is obtained by summing the machining times of the workpieces produced by the machines 12-1 to 12-*n*, the machining times being acquired by the measurement information acquisition part 18. The calculated total machining time is also stored in the database unit 25.

Subsequently, in step S15 of FIG. 2, the decision part 21 decides whether the part dimensions calculated by the part dimension calculation part 19 fall within the predetermined range of dimensions. If the calculated part dimensions do not fall within the predetermined range of dimensions as a decision result, the process returns to step S11 where the tolerance setting part 23 resets a workpiece tolerance for each of the machines 12-1 to 12-*n*. For example, the tolerance setting part 23 reduces, with the same reduction ratio, workpiece tolerances previously set for the respective machines 12-1 to 12-*n*. In other words, closer tolerances are set. If the calculated part dimensions fall within the predetermined range of dimensions as a decision result of step S15, the process advances to step S16 of FIG. 2.

In step S16 of FIG. 2, the decision part 21 decides whether the total machining time calculated by the total machining-time calculation part 20 falls within the predetermined time. If the calculated total machining time does not fall within the predetermined time as a decision result, the process returns to step S11 where the tolerance setting part 23 resets a workpiece tolerance for each of the machines 12-1 to 12-*n*. At this point, workpiece tolerances previously set for some of the machines 12-1 to 12-*n* are increased with the predetermined enlargement ratio. In other words, rough tolerances are set. In this case, it is preferable that the machines with the rough workpiece tolerances out of the machines 12-1 to 12-*n* be those which are likely to contribute to a reduction in total machining time. For example, the machine for producing a workpiece with a maximum machining time is preferably selected from the machines 12-1 to 12-*n*. The predetermined enlargement ratio may be equal to, for example, the reduction ratio. If the calculated total machining time falls within the predetermined time as a decision result of step S16, the process advances to step S12. Specifically, a workpiece is produced for each of the machines 12-1 to 12-*n* without changing the previously set workpiece tolerances.

As described above, when a part including multiple workpieces is manufactured by the machines 12-1 to 12-*n*, the machine controller 13 of the present embodiment repeats steps S11 to S16.

During manufacturing of a part including multiple workpieces, the manufacturing adjustment system 10 thus configured sets a workpiece tolerance for each of the machines 12-1 to 12-*n* in real time, thereby adjusting the dimensions and manufacturing time of the manufactured part within the respective predetermined ranges.

Figure 3:
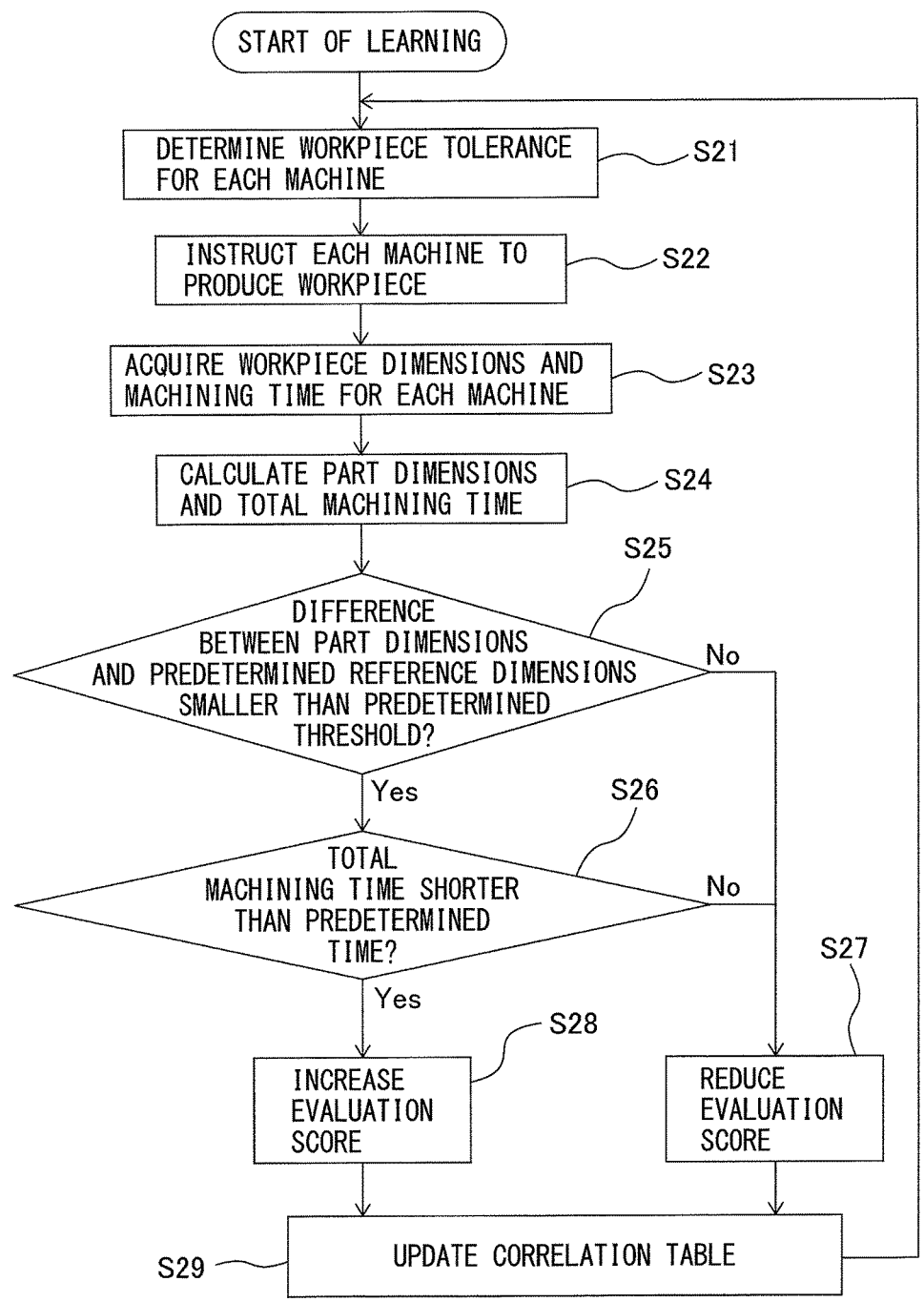
FIG. 3 is a flowchart showing another operation example of the manufacturing adjustment system shown in FIG. 1.

FIG. 3 is a flowchart showing another operation example of the manufacturing adjustment system 10 shown in FIG. 1.

Referring to FIG. 3, another operation example of the manufacturing adjustment system 10 in FIG. 1 will be discussed below. In the following example, the learning unit 27 of the manufacturing administrative computer 14 particularly learns the optimum tolerances of workpieces.

Before the start of learning, the database unit 25 stores a correlation table showing a correlation between a workpiece tolerance for each of the machines 12-1 to 12-*n* and part dimensions and total machining times when workpieces produced according to the tolerances are combined. The correlation table is preferably created according to the processing of steps S11 to S16 shown in FIG. 2.

First, in step S21 of FIG. 3, the learning unit 27 determines a workpiece tolerance for each of the machines 12-1 to 12-*n* from the correlation table. Subsequently, in step S22 of FIG. 3, the operation command part 24 instructs each of the machines 12-1 to 12-*n* to produce a workpiece in response to a command for the tolerance determined by the learning unit 27. This produces a workpiece in each of the machines 12-1 to 12-*n* according to the tolerance determined by the learning unit 27. During the production, the measuring instrument 17 measures the machining time of a workpiece for each of the machines 12-1 to 12-*n*. After the completion of the production of a workpiece in each of the machines 12-1 to 12-*n*, the measuring instrument 17 measures the dimensions of the workpieces in the machines 12-1 to 12-*n*.

Moreover, in step S23 of FIG. 3, the measurement information acquisition part 18 acquires in real time the dimensions and machining times of the workpieces measured by the measuring instruments 17 of the machines 12-1 to 12-*n*.

Subsequently, in step S24 of FIG. 3, the part dimension calculation part 19 and the total machining-time calculation part 20 respectively calculate the dimensions and total machining time of the part that is an assembly of the workpieces. The calculated part dimensions and total machining time are stored in the database unit 25 of the manufacturing administrative computer 14. Step S24 is identical to step S14 of FIG. 2.

Subsequently, in step S25 of FIG. 2, the learning unit 27 decides whether a difference (absolute value) between the part dimension calculated by the part dimension calculation part 19 and the predetermined reference dimension for the part is smaller than a predetermined threshold. At this point, the learning unit 27 provides the part dimension with an evaluation score corresponding to the difference. If the difference is larger than the predetermined threshold, the process advances to step S27 of FIG. 3, in which the learning unit 27 reduces the evaluation score according to the difference. If the difference is smaller than the predetermined threshold as a decision result of step S25, the process advances to step S26 of FIG. 3.

In step S26 of FIG. 2, the learning unit 27 decides whether the total machining time calculated by the total machining-time calculation part 20 is shorter than the predetermined time. At this point, the learning unit 27 provides the total machining time with an evaluation score corresponding to the length of the total machining time relative to the predetermined time. If the total machining time is longer than the predetermined time, the process advances to step S27 of FIG. 3, in which the learning unit 27 reduces the evaluation score according to the length of the total machining time relative to the predetermined time. If the total machining time is shorter than the predetermined time as a decision result of step S26, the process advances to step S28 of FIG. 3. In step S28 of FIG. 3, the learning unit 27 increases the evaluation score according to the brevity of the total machining time relative to the predetermined time.

In step S29 of FIG. 3, the learning unit 27 updates the correlation table. Specifically, the learning unit 27 writes, in the correlation table, the workpiece tolerances determined in step S21 and the evaluation scores obtained in step S27 and step S28, the workpiece tolerances and evaluation scores being correlated with each other.

Steps S21 to S29 are repeated during the manufacturing of parts, allowing the learning unit 27 to continuously update the correlation table.

After that, the learning unit 27 preferably determines, as an optimum value, a workpiece tolerance for each of the machines 12-1 to 12-n with the highest evaluation score from the correlation table, and then transmits the value to the tolerance setting part 23.

According to the learning function, the tolerances of workpieces constituting a part can be optimized so as to set the part dimensions within the predetermined range of dimensions and minimize the total machining time for manufacturing the part.

Another Embodiment will be Described Below.

In the manufacturing facility 11 of the foregoing embodiment, different workpieces machined by the machines 12-1 to 12-n are assembled by another machine to complete a part, whereas in the following embodiment, workpieces are sequentially produced by machines 12-1 to 12-n according to a predetermined order of the machines 12-1 to 12-n and the produced workpieces are sequentially combined so as to complete a part in the final machine 12-n.

Specifically, referring to FIG. 1, a first workpiece produced by the first machine 12-1 is combined with a second workpiece produced by the second machine 12-2. Subsequently, an assembly of the first workpiece and the second workpiece is combined with an n-th workpiece produced by the n-th machine 12-n, thereby completing the part. In the following description, the present invention is applied to a manufacturing line for implementing the manufacturing process.

In another embodiment, the same configuration as the manufacturing adjustment system 10 in FIG. 1 is used. However, the decision part 21 and the tolerance setting part 23 in FIG. 1 have additional functions as follows:

In the manufacturing line, each time a workpiece is produced by the machines 12-1 to 12-n in the order of the machines 12-1 to 12-n, a measuring instrument 17 in each of the machines 12-1 to 12-n measures the dimensions of the workpiece. A measurement information acquisition part 18 acquires, in real time, measurement information including the dimensions of the measured workpiece.

The decision part 21 of another embodiment has an additional function of deciding, each time the measurement information acquisition part 18 acquires the dimensions of a workpiece produced by the machines 12-1 to 12-n, whether workpiece dimensions fall within a predetermined range of workpiece dimensions.

Furthermore, based on the decision result of the decision part 21 regarding a workpiece produced by the first machine that is any one of the machines 12-1 to 12-n, the tolerance setting part 23 has an additional function of adjusting a workpiece tolerance previously set for the second machine in charge of a process immediately after the first machine. For example, if the dimension of the workpiece produced by the first machine considerably deviates from the predetermined range of workpiece dimensions, the set value of a workpiece tolerance is preferably adjusted in the second machine in consideration of dimensions corresponding to a deviation.

Machining in a downstream process can be adjusted according to a machining status of an upstream process, thereby minimizing variations in the dimensions of the finished part. Moreover, parts can be manufactured according to the machine status of the upstream process and an unexpected dimensional change caused by a machining status.

The manufacturing facility 11 to which another embodiment is applicable may be a manufacturing line where an article (workpiece) to be machined is sequentially machined by the machines 12-1 to 12-n so as to complete a part.

The present invention was described according to the typical embodiments. A person skilled in the art could understand that the embodiments can be changed and various other changes, omissions, and additions may be made without departing from the scope of the present invention.

Effect of Aspects of the Present Disclosure

According to a first aspect of the present disclosure, a workpiece tolerance for each machine can be set in real time during the manufacturing of a part including multiple workpieces, thereby adjusting the dimensions and manufacturing time of the manufactured part within respective predetermined ranges.

According to a second aspect of the present disclosure, machining in a downstream process can be adjusted according to the machining status of an upstream process, thereby minimizing variations in the dimensions of a finished part. Moreover, parts can be manufactured according to the machine status of the upstream process and an unexpected dimensional change caused by a machining status.

According to third and fourth aspects of the present disclosure, a workpiece tolerance for each machine can be adjusted in real time in consideration of an actual machine status or an actual workpiece machining status, for example, machining accuracy reduced by wear of a tool. Particularly according to the fourth aspect, the tolerances of workpieces constituting a part can be optimized so as to set the part dimensions within the predetermined range of dimensions and minimize the total machining time for manufacturing the part.

What is claimed is:

1. A manufacturing adjustment system that adjusts a manufacturing status of a manufacturing facility where a part including multiple workpieces is manufactured,
the manufacturing adjustment system comprising:
multiple machines that manufacture the workpieces, the machines each having a measuring instrument that measures dimensions and a machining time of the workpiece; and
a machine controller that controls the machines, the machine controller being connected so as to communicate with the machines,
the machine controller comprising:
a measurement information acquisition part that acquires, in real time, measurement information including the dimensions and machining times of the workpieces measured by the measuring instruments of the machines;
a part dimension calculation part that calculates dimensions of the part based on the dimensions of the workpieces produced by the machines, the dimensions being acquired by the measurement information acquisition part;

a total machining-time calculation part that calculates a total machining time of the machining times of the workpieces based on the machining times of the workpieces produced by the machines, the machining times being acquired by the measurement information acquisition part;

a decision part that decides whether the part dimensions calculated by the part dimension calculation part fall within a predetermined range of dimensions and the total machining time calculated by the total machining-time calculation part falls within a predetermined time;

a tolerance setting part that sets a workpiece tolerance for each of the machines based on a decision result of the decision part when the workpieces are produced by the machines; and an operation command part that transmits, to each of the machines, an operation command including the workpiece tolerance set for each of the machines.

2. The manufacturing adjustment system according to claim 1, wherein the manufacturing facility is a manufacturing line where the workpieces are sequentially produced by the machines according to a predetermined order of the machines and then the produced workpieces are sequentially combined so as to complete the part in the final machine, each time the workpiece is produced by the machine in the predetermined order of the machines, the measuring instrument in each of the machines measures the dimensions of the workpiece and the measurement information acquisition part acquires the measured dimensions of the workpiece in real time, the decision part has a function of deciding, each time the measurement information acquisition part acquires the dimensions of the workpiece produced by each of the machines, whether the dimensions of the workpiece fall within a range of dimensions, the range being determined for each of the workpieces, and the tolerance setting part has a function of adjusting a workpiece tolerance previously set for a second machine in charge of a process immediately after a first machine, based on a decision result of the decision part regarding the workpiece produced by the first machine that is any one of the machines.

3. The manufacturing adjustment system according to claim 1, further comprising a manufacturing administrative computer that manages a manufacturing status of the part, the manufacturing administrative computer being connected so as to communicate with the machine controller, wherein the measurement information acquisition part transmits the measurement information acquired for each of the machines to the manufacturing administrative computer, the part dimension calculation part transmits the dimensions of the part to the manufacturing administrative computer, the total machining-time calculation part transmits the total machining time to the manufacturing administrative computer, and the tolerance setting part transmits a workpiece tolerance set for each of the machines to the manufacturing administrative computer, the manufacturing administrative computer comprising:

a database unit where a workpiece tolerance set for each of the machines, the workpiece dimensions and machining times, and the part dimensions and total machining time are stored in association with one another, the workpiece dimensions and machining times being acquired from the measuring instruments each time the workpiece is produced by the machines according to the workpiece tolerance, the part dimensions and total machining time being calculated based on the workpiece dimensions and machining times, a dimension variation diagnosis unit that diagnoses variations in workpiece dimensions in each of the machines, the dimensions being sequentially stored in the database unit each time the workpiece is produced by each of the machines according to a workpiece tolerance set for each of the machines.

4. The manufacturing adjustment system according to claim 3, wherein the manufacturing administrative computer further comprises a learning unit that learns optimum tolerances of the workpieces based on the workpiece tolerances stored for the machines in the database unit and the dimensions and total machining time of the part including the workpieces produced according to the workpiece tolerances.

* * * * *